United States Patent Office 3,424,685
Patented Jan. 28, 1969

3,424,685
HIGH PERMEABILITY FERROMAGNETIC FERRITE MATERIALS
André Pierrot and Yves Lescroel, Conflans Sainte Honorine, France, assignors to International Telephone and Telegraph Corporation, New York, N.Y., a corporation of Maryland
No Drawing. Filed Mar. 23, 1965, Ser. No. 442,182
U.S. Cl. 252—62.6    3 Claims
Int. Cl. C04b 35/26

The invention relates to ferromagnetic materials of the ferrite type and cores manufactured with these materials, which cores are usable for the manufacture of high quality inductance coils intended to operate up to frequencies of the order of 1,000 kilocycles and even above.

Manganese-zinc ferrites used up to now possess fairly considerable eddy current and hysteresis losses. Methods are already known for reducing these losses by adding certain metallic oxides to the ferromagnetic material. For example, it is known from British Patent specification No. 776,710 and corresponding U.S. Patent No. 2,903,429 to use calcium oxide for this purpose.

If the polished and etched section of a ferrite be examined under a microscope it exhibits a granular structure, and the properties of ferrites can be explained by considering them as a granular structure composed of a crystalline phase, and a more or less well defined second phase forming the boundaries of the grains of the first phase.

The above mentioned British Patent specification No. 776,710 describes how when calcium oxide is added to a mixture of oxides containing manganese and adapted to form a ferrite a part of the calcium penetrates into the grain boundaries as the ferrite is formed and constitutes part compound of high electrical resistance.

It has now been found by the applicant that improved materials can be obtained by adding to ferrites small quantities of copper oxide and of one at least of the following metallic oxides: calcium oxide, antimony oxide, vanadium oxide.

In consequence of the presence of these different oxides, the grains of magnetic material are encased by an insulating substance which largely prevents eddy currents developing in the mass of the magnetic material, and consequently limits the eddy current losses; the presence of these oxides also has the effect of reducing hysteresis losses by equalising the dimensions of the grains.

Therefore, according to one feature of the invention there is provided a method of manufacture of a ferromagnetic ferrite material containing manganese and zinc which includes forming grain boundaries containing copper and at least one of the metals: calcium, antimony and vanadium.

According to another feature of the invention there is provided a method of manufacture of a ferromagnetic ferrite material containing manganese and zinc which includes adding to the oxides intended to form the ferrite an amount of copper oxide between 0.05% and 0.5% by weight together with between 0.1% and 2.0% by weight of at least one of the metal oxides: calcium oxide, antimony oxide and vanadium oxide, the total of the additions being at most equal to 2.5% by weight, pressing and heat treating.

A preferred process of pressing and heat treating will now be described.

The different additions are added to the initial mixture of oxides of the basic composition before milling. This milling is carried out in steel mills, with steel balls, the water added being equal, in litres, to about 1.5 times the weight of the material in kilogrammes. The duration of milling is from 10 to 60 hours, for example, according to the type of mill.

The filtered and dried materials is then compressed with pressures varying from 1 to 15 metric tons per square centimetre.

The cores are then heated in furnaces in which there is a neutral nitrogen atmosphere, containing from 1% to 5% of oxygen by volume. The level temperature is from 1,200 to 1,300° C. and the duration of the heat treatment at this temperature about 5 hours. Cooling down is carried out in about 15 hours, in pure nitrogen.

In the following description the qualities of the materials studied will be characterised, as usual, by their initial permeability $\mu$, by their coefficient of eddy current losses $F_n$, by their coefficient of hysteresis losses $h$, and by their coefficient of residual losses $t$. These different coefficients can be measured by means of a coil of inductance $L$, expressed in henrys, wound on a core made of the ferromagnetic material studied, of which the effective resistance, in ohms, at the frequency $f$ in hertz is measured, as well as the part $R_p$ of this resistance due to the losses in the core. The ratio $Q=L_w/R_p$ will be called the quality factor, where $w$ is the angular frequency, which is equal to $2\pi f$ radians per second.

The initial magnetic permeability of the material constituting the core, designated by $\mu$, is measured on a toroidal core, in a magnetising field lower than 1 millioersted and for a frequency of 800 hertz, at the temperature of 20° C.

The different loss coefficients are defined by the formula:

$$\frac{R_p}{L}=F_n\cdot\frac{f^2}{(800)^2}+h\cdot\frac{N\cdot I}{l}\cdot\frac{f}{800}+t\cdot\frac{f}{800}$$

in which $R_p$ is the resistance due to the losses in the ferrite core of an inductance coil in ohms.
$L$ is the inductance of this coil, in henrys.
$f$ is the frequency in hertz.
$N$ is the number of turns in the winding of the coil.
$I$ is the length of the mean magnetic line of force, in amperes.
$l$ is the length of the mean magnetic line of force, in centimetres.
$F_p$ is the coefficient of eddy current losses.
$h$ is the coefficient of hysteresis losses.
$t$ is the coefficient of residual losses.

The eddy current loss coefficient $F_n$, expressed in ohms per henry, is measured between 100 and 200 kilohertz and reset to 800 hertz, for a field of 2 millioersteds and at a temperature of about 20° C.

The hysteresis loss coefficient $h$ is expressed in ohms per henry, for a field of $N.I/l=$one ampere turn per centimetre for the frequency of 100 kilohertz, reset to 800 hertz and measured between fields of 2 and of 22 millioersteds, at the temperature of about 20° C.

The residual loss coefficient $t$, expressed in ohms per henry, is deduced from the ordinate at the origin of the curve $R_p/fL$ obtained for a nul field.

The coefficients $F_n/\mu$, $h/\mu^2$, $t/\mu$ have been introduced, which allow of the quality of different materials to be judged and which do not depend on a possible air gap.

EXAMPLE 1

Starting with relatively pure ferric oxide $Fe_2O_3$ manganese oxide $MnO$ and zinc oxide $ZnO$ (total content of impurities less than 0.1%), these oxides are milled and intimately mixed in an iron mill with steel balls, for 48 hours.

The composition before milling is indicated below in molecular percentages:

52.5 $Fe_2O_3$, 28.3 MnO, 19.2 ZnO

After drying and compression into a core, the core is submitted to a heat treatment.

The temperature of heating is 1,265° C. and the duration at this level about 5 hours.

The proportion of oxygen in the atmosphere of the furnace is 1% during the level temperature stage; the cooling takes place in pure nitrogen.

This material possesses the following properties:

$$\mu = 3,000$$

$$\frac{F_n}{\mu} \cdot 10^3 = 20$$

$$\frac{h}{\mu 2} \cdot 10^6 = 5,000$$

$$\frac{t}{\mu} \cdot 10^3 = 2.0$$

$\mu Q = 24,000$ at the frequency of 100 kHz.

EXAMPLE 2

The starting composition is that of Example 1 to which is added 0.1% of copper oxide, 0.5% of calcium oxide and 0.5% of antimony oxide, all by weight.

The same heat treatment is applied as for Example 1; the following properties are obtained:

$$\mu = 2,400$$

$$\frac{F_n}{\mu} \cdot 10^3 = 0.17$$

$$\frac{h}{\mu 2} \cdot 10^6 = 600$$

$$\frac{t}{\mu} \cdot 10^3 = 0$$

$\mu Q = 224,000$ at the frequency of 100 kHz.

EXAMPLE 3

With the same basic composition and the same heat treatment as for Example 1, but in adding to the starting composition, 0.1% of copper oxide and 0.5% of antimony oxide by weight, the following properties are obtained:

$$\mu = 3,400$$

$$\frac{F_n}{\mu} \cdot 10^3 = 0.70$$

$$\frac{h}{\mu 2} \cdot 10^6 = 290$$

$$\frac{t}{\mu} \cdot 10^3 = 0$$

$\mu Q = 110,000$ at the frequency of 100 kHz.

EXAMPLE 4

With the same basic composition and the same heat treatment as for Example 1, but adding to the starting composition 0.1% of copper oxide, 0.1% of calcium oxide, 1% of antimony oxide and 0.1% of vanadium oxide by weight, the following properties are obtained:

$$\mu = 2,000$$

$$\frac{F_n}{\mu} \cdot 10^3 = 0.18$$

$$\frac{h}{\mu 2} \cdot 10^6 = 500$$

$$\frac{t}{\mu} \cdot 10^3 = 2$$

$\mu Q = 220,000$ at the frequency of 100 kHz.

EXAMPLE 5

With the same basic composition and the same heat treatment as Example 1, but with adding 0.1% of copper oxide and 0.1% of calcium oxide by weight, the following properties are obtained:

$$\mu = 4,000$$

$$\frac{F_n}{\mu} \cdot 10^3 = 0.7$$

$$\frac{h}{\mu 2} \cdot 10^6 = 400$$

$$\frac{t}{\mu} \cdot 10^3 = 0$$

$\mu Q = 208,000$ at the frequency of 100 kHz.

EXAMPLE 6

The composition before milling is indicated below in molecular percentages:

54.5 $Fe_2O_3$, 30 MnO, 15.5 ZnO

With a heat treatment identical to that of Example 1, except that during the level temperature stage the proportion of oxygen is 5%, a material is obtained having the following properties:

$$\mu = 1,800$$

$$\frac{F_n}{\mu} \cdot 10^3 = 0.7$$

$$\frac{h}{\mu 2} \cdot 10^6 = 700$$

$$\frac{t}{\mu} \cdot 10^3 = 2.0$$

$\mu Q = 11,000$ at the frequency of 0.3 mHz.

EXAMPLE 7

With the same basic composition and the same heat treatment as Example 6, but with adding 0.5% of antimony oxide, 0.1% of copper oxide and 0.5% of calcium oxide by weight, the material obtained has the following properties:

$$\mu = 2,200$$

$$\frac{F_n}{\mu} \cdot 10^3 = 0.10$$

$$\frac{h}{\mu 2} \cdot 10^6 = 300$$

$$\frac{t}{\mu} \cdot 10^3 = 1.0$$

$\mu \cdot Q = 100,000$ at the frequency of 0.3 mHz.

EXAMPLE 8

The composition before milling is indicated below in molecular percentages:

54.0 $Fe_2O_3$, 38.0 MnO, 8.0 ZnO

With a heat treatment identical to that of Example 1, a material is obtained having the following properties:

$$\mu = 1,950$$

$$\frac{F_n}{\mu} \cdot 10^3 = 1.2$$

$$\frac{h}{\mu 2} \cdot 10^6 = 760$$

$$\frac{t}{\mu} \cdot 10^3 = 2.0$$

$\mu \cdot Q = 12,000$ at the frequency of 0.1 mHz.

EXAMPLE 9

With the same basic composition and the same heat treatment as Example 8, but with adding 0.1% of copper oxide, 0.1% of calcium oxide, 0.1% of vanadium oxide and 0.5% of antimony oxide by weight, the material obtained has the following properties.

$$\mu = 1{,}800$$

$$\frac{F_n}{\mu} \cdot 10^3 = 0.20$$

$$\frac{h}{\mu^2} \cdot 10^6 = 450$$

$$\frac{t}{\mu} \cdot 10^3 = 2.0$$

$\mu \cdot Q = 180{,}000$ at the frequency of 0.1 mHz.

It is to be understood that the foregoing description of specific examples of this invention is not to be considered as a limitation of its scope.

What we claim is:

1. A method of manufacture of a ferromagnetic ferrite material which includes forming a homogeneous initial mixture of metallic oxide powders including 52.5–54.5 ferric oxide $Fe_2O_3$, 29.3–30 mol percent manganese oxide and 15.5–19.2 mol percent zinc oxide, to which is added an amount of copper oxide between 0.05% and 0.5% by weight together with between 0.1% and 2.0% by weight of at least one of the metal oxides: calcium oxide, antimony oxide and vanadium oxide, the total of additions being at most equal to 2.5% by weight, compressing the initial mixture under a pressure of 1 to 15 metric tons per square centimetre, and heat treating the compressed mixture at a temperature between 1,200 and 1,300° C., for about 5 hours, in an atmosphere of nitrogen containing 1 to 5% by volume of oxygen, followed by cooling in nitrogen for about 15 hours, the composition of the initial mixture being such that, with the heat treatment indicated, the final product contains approximately 50 molecular percent of ferric oxide $Fe_2O_3$.

2. A method of manufacture of a ferromagnetic ferrite material as claimed in claim 1, in which the initial mixture includes 52.5 mol percent of ferric oxide, 28.3% of manganese oxide and 19.2 mol percent of zinc oxide.

3. A method of manufacture of a ferromagnetic ferrite material as claimed in claim 2 in which the addition to the initial mixture consists of an amount of copper oxide between 0.05% and 0.5% by weight together with between 0.1% and 2.0% by weight of calcium oxide.

References Cited
UNITED STATES PATENTS

| | | | |
|---|---|---|---|
| 2,903,429 | 9/1959 | Gillaud | 252—62.5 |
| 3,106,534 | 10/1963 | Akashi et al. | 252—62.5 |
| 3,110,676 | 11/1963 | Albers-Schoenberg | 252—62.5 |
| 3,188,290 | 6/1965 | Dam et al. | 252—62.5 |

TOBIAS E. LEVOW, *Primary Examiner.*

R. D. EDMONDS, *Assistant Examiner.*

U.S. Cl. X.R.
252—62.56, 62.63